United States Patent Office 3,123,601
Patented Mar. 3, 1964

3,123,601
ACETAL AND KETAL DERIVATIVES OF 3-(LOWER ALKOXY)-Δ$^{3,5}$-PREGNADIENE - 16α,17α - DIOL-20-ONE
Patrick Diassi, Westfield, N.J., assignor to Olin Mathieson Chemical Corporation, New York, N.Y., a corporation of Virginia
No Drawing. Filed Nov. 17, 1961, Ser. No. 153,204
3 Claims. (Cl. 260—239.55)

This application is a continuation-in-part of application Serial No. 13,994, filed March 10, 1960, and now abandoned.

This invention relates to compounds having the formula (I)
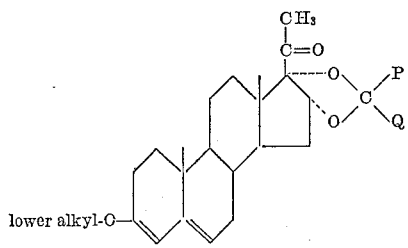

wherein P and Q are hydrogen, lower alkyl, halogenated lower alkyl, monocyclic cycloalkyl, monocyclic aryl, monocyclic aryl lower alkyl, monocyclic heterocyclic, or monocyclic heterocyclic alkyl, or together with the carbon atom to which they are joined P and Q is cycloalkyl or monocyclic heterocyclic.

The compounds of Formula I are prepared by reacting a compound of the formula (II)
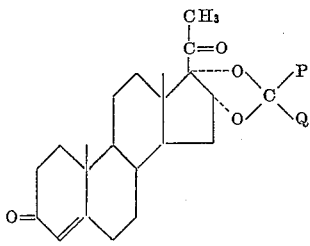

wherein P and Q are as hereinbefore defined, with a lower alkyl orthoformate such as ethyl orthoformate, butyl orthoformate and the like in the presence of an acid, such as sulfuric acid.

The starting materials for the process of this invention, i.e., the compounds of Formula II are prepared, by an acid condensation reaction disclosed in: Steroids, Feiser, p. 690 (1959); J.A.C.S. (Fried), vol. 80, 2338 (1958); and application Serial No. 774,607, filed November 18, 1958, now Patent No. 2,941,997, and Serial No. 774,615, filed November 18, 1958, now Patent No. 2,941,998, and Serial No. 775,388, filed November 21, 1958, now abandoned; by interacting 16α,17α-dihydroxyprogesterone with an aldehyde or ketone of the general formula:

in the presence of an acid catalyst.

Suitable starting materials are the 16α,17α-acetal and ketal derivatives of 16α,17α-dihydroxyprogesterone with a lower alkanal such as formaldehyde, trioxymethylene, paraldehyde, propanal and hexanal; or with a ketone such as di(lower alkyl)ketone, e.g., acetone, diethyl ketone, dibutyl ketone, methylethyl ketone, and methyliso-butyl ketone; or a cycloalkanone such as cyclopentanone, cyclohexanone, suberone and cyclooctanone; or a monocyclic aromatic aldehyde such as benzaldehyde, halobenzaldehyde (e.g., p-chlorobenzaldehyde), lower alkoxybenzaldehyde (e.g., o-anisaldehyde), di(lower alkoxy)-benzaldehyde (e.g. veratraldehyde), hydroxybenzaldehyde (e.g., salicylaldehydes), dihydroxybenzaldehyde (e.g., resorcylaldehyde), lower alkyl benzaldehyde (e.g., m-tolualdehyde and p-ethylbenzaldehyde), di(lower alkyl)benzaldehyde (e.g., o,p-dimethylbenzaldehyde), nitrobenzaldehyde, acylamidobenzaldehyde (e.g., N-acetylanthranilaldehyde), and cyanobenzaldehyde; a monocyclic aromatic lower alkanal, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; a monocyclic heterocyclic aldehyde, such as alloxan, picolinaldehydes, furfural, thiophene carbonals, and halo, lower alkoxy, hydroxy, lower alkyl, nitro, and cyano derivatives thereof; a monocyclic heterocyclic lower alkanal; a monocyclic aromatic ketone such as acetophenone, propiophenone, butyrophenone, valerophenone, isocaprophenone, halophenyl lower alkyl ketone (e.g., p-chloroacetophenone), (lower alkoxy)phenyl lower alkyl ketone (e.g., p-anisyl methyl ketone), di(lower alkoxy)phenyl lower alkyl ketone, hydroxyphenyl lower alkyl ketone, dihydroxyphenyl lower alkyl ketone (e.g., resacetophenone), a (lower alkyl)phenyl lower alkyl ketone (e.g., methyl p-tolyl ketone), a di-(lower alkyl)-phenyl lower alkyl ketone (e.g., o,p-xylyl methyl ketone), a nitrophenyl lower alkyl ketone (e.g., nitroacetophenone), an acylamidophenyl lower alkyl ketone (e.g., acetyl-acetanilide), and a cyanophenyl lower alkyl ketone; benzophenone, and mono or bis substituted halo, lower alkoxy, hydroxy, lower alkyl, nitro, acylamido and cyano derivatives thereof; a monocyclic aromatic lower alkanone, such as 1-phenyl-3-butanone and 1-phenyl-4-pentanone, and mono or bis halo, lower alkoxy hydroxy, lower alkyl, nitro, acylamido and cyano substituted derivatives thereof; a monocyclic heterocyclic ketone (e.g., 2-acetylfuran, 2-benzoylfuran, and 2-acetylthiophene); a monocyclic heterocyclic lower alkanone; a halo-lower alkanal (e.g., chloral hydrate, trifluoroacetaldehyde hemiacetal and heptafluorobutanal ethyl hemiacetal); or a halo alkanone (e.g., as 1,1,1-trifluoroacetone).

The compounds of this invention are physiologically active substances which possess progestational activity when administered either orally or parenterally in conventional dosage forms and hence can be used in the treatment of such conditions as habitual or threatened abortion as a substitute for and in the same manner as progesterone.

The following examples are presented to more fully illustrate this invention (all temperatures being in centigrade):

EXAMPLE 1

3-Ethoxy-Δ$^{3,5}$-Pregnadiene-16α,17α-Diol-20-One 16,17-Acetonide

To a solution of 1.00 g. (2.59 mmols.) of 16α,17α-dihydroxyprogesterone 16,17-acetonide in 7.5 ml. of anhydrous dioxane, absolute ethanol (0.1 ml.) and ethyl orthoformate (1 ml.) are added. To this mixture, there is added dropwise a solution of 0.035 ml. of sulfuric acid in 0.7 ml. of dioxane. The reaction is left at room temperature for 15 minutes and then neutralized by the addition of 0.6 ml. of pyridine. Water is then added slowly whereupon 3-ethoxy-Δ$^{3,5}$-pregnadiene-16α,17α-diol-20-one 16,17-acetonide separates in the form of long needles. These crystals are filtered, washed with methanol-water containing a drop of pyridine and dried, yielding about 978 mg. of product having the following properties: M.P. about 199–201°

$\lambda_{max.}^{EtOH}$ 240 m$\mu$ ($\epsilon$=19,500); $\lambda_{max.}^{Nujol}$ 5.88, 6.00, 6.07, 6.18$\mu$ Analysis.—Calc'd. for $C_{26}H_{38}O_4$ (414.56): C, 75.32; H, 9.24; $OC_2H_5$, 10.87. Found: C, 74.94; H, 8.99; $OC_2H_5$, 11.05.

In a similar manner, except for the substitution of an equivalent amount of butyl orthoformate for the ethyl orthoformate of Example 1, there is readily obtained 3-butoxy-$\Delta^{3,5}$-pregnadiene-16$\alpha$,17$\alpha$-diol-20 - one 16$\alpha$,17$\alpha$-acetonide.

EXAMPLE 2

16,17-Acetophenone Derivative of 3-Ethoxy-$\Delta^{3,5}$-Pregnadiene-16$\alpha$,17$\alpha$-Diol-20-One Following the procedure of Example 1 except for the substitution of the 16$\alpha$,17$\alpha$-acetophenone ketal of 16$\alpha$,17$\alpha$-dihydroxyprogesterone for the acetonide used in Example 1, there is obtained the acetophenone derivative of 3-ethoxy-16$\alpha$,17$\alpha$-dihydroxy-$\Delta^{3,5}$-pregnadiene-20-one.

The corresponding p-chloroacetophenone derivative and p-nitro-acetophenone derivatives can be obtained by substituting in the procedure of Example 1, the p-chloroacetophenone derivative of 16$\alpha$,17$\alpha$-dihydroxyprogesterone and the p-nitroacetophenone derivative of 16$\alpha$,17$\alpha$-dihydroxyprogesterone, respectively.

In a similar manner, by substituting the methylisobutylketone, methylethyl ketone, benzaldehyde furfural, benzophenone 2-acetal-furane, chloral, 1,1,1-trifluoroacetone and the heptafluorobutanal derivatives of 16$\alpha$,17$\alpha$-dihydroxyprogesterone in the procedure of Example 1, the following are respectively prepared: 16$\alpha$,17$\alpha$-methylisobutylketone derivative of 3-ethoxy-$\Delta^{3,5}$-pregnadiene-16$\alpha$,17$\alpha$-diol-20-one; 16$\alpha$,17$\alpha$-methylethylketone derivative of 3-ethoxy-$\Delta^{3,5}$-pregnadiene-16$\alpha$,17$\alpha$-diol-20-one; 16$\alpha$,17$\alpha$-benzaldehyde derivative of 3-ethoxy-$\Delta^{3,5}$-pregnadiene-16$\alpha$,17$\alpha$-diol-20-one; 16$\alpha$,17$\alpha$-furfural derivative of 3-ethoxy-$\Delta^{3,5}$-pregnadiene-16$\alpha$,17$\alpha$-diol-20-one; 16$\alpha$,17$\alpha$-benzophenone derivative of 3-ethoxy-$\Delta^{3,5}$-pregnadiene-16$\alpha$,17$\alpha$-diol-20-one; 16$\alpha$,17$\alpha$-2-acetyl-furane derivative of 3-ethoxy-$\Delta^{3,5}$-pregnadiene-16$\alpha$,17$\alpha$-diol-20-one; 16$\alpha$,17$\alpha$-chloral derivative of 3-ethoxy-$\Delta^{3,5}$-pregnadiene-16$\alpha$,17$\alpha$-diol-20-one; 16$\alpha$,17$\alpha$-1,1,1-trifluoroacetone derivative of 3-ethoxy-$\Delta^{3,5}$-pregnadiene-16$\alpha$,17$\alpha$-diol-20-one; and 16$\alpha$,17$\alpha$-heptafluorobutanal derivative of 3-ethoxy-$\Delta^{3,5}$-pregnadiene-16$\alpha$,17$\alpha$-diol-20-one.

This invention may be variously otherwise embodied within the scope of the appended claims.

What is claimed is:

1. Compounds of the formula:

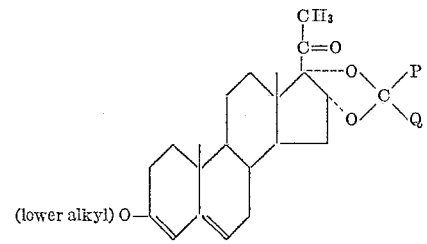

wherein P and Q are individually selected from the group consisting of hydrogen, lower alkyl, halogenated lower alkyl, monocyclic cycloalkyl, monocyclic aryl, monocyclic aryl lower alkyl, monocyclic heterocyclic, and together with the carbon atom to which P and Q are joined cycloalkyl and monocyclic heterocyclic.

2. 3-ethoxy-$\Delta^{3,5}$-pregnadiene-16$\alpha$,17$\alpha$-diol-20-one 16$\alpha$,17$\alpha$-acetonide.

3. 16$\alpha$,17$\alpha$-acetophenone derivative of 3-ethoxy-$\Delta^{3,5}$-pregnadiene-16$\alpha$,17$\alpha$-diol-20-one.

References Cited in the file of this patent
UNITED STATES PATENTS 2,941,997 Fried _____ June 21, 1960
3,009,858 Ercoli _____ Nov. 21, 1961

OTHER REFERENCES

Cooley et al.: J.C.S. (London), 1955, pages 4373–4376.

Ercoli et al.: J.A.C.S., 82, Feb. 5, 1960, pages 746–748.

Notice of Adverse Decision in Interference

In Interference No. 95,583 involving Patent No. 3,123,601, P. A. Diassi, ACETAL AND KETAL DERIVATIVES OF 3-(LOWER ALKOXY)-$\Delta^3$, 5-PREGNADIENE 16a, 17a-DIOL-20-ONE, final judgment adverse to the patentee was rendered May 6, 1968, as to claims 1, 2 and 3.

[*Official Gazette August 20, 1968.*]